US009810333B2

(12) United States Patent
Brazier et al.

(10) Patent No.: US 9,810,333 B2
(45) Date of Patent: Nov. 7, 2017

(54) FLANGE ADAPTER

(75) Inventors: Geof Brazier, Woodbury, MN (US);
Donall Cullinane, Bray (IE); John Tomasko, Claremore, OK (US)

(73) Assignee: BS&B Safety Systems Limited, Limerick (IE)

( * ) Notice: Subject to any disclaimer, the term of this patent is extended or adjusted under 35 U.S.C. 154(b) by 799 days.

(21) Appl. No.: 10/936,761

(22) Filed: Sep. 9, 2004

(65) Prior Publication Data

US 2006/0049635 A1    Mar. 9, 2006

(51) Int. Cl.
*F16L 23/00*    (2006.01)
*F16K 17/16*    (2006.01)
*F16L 23/16*    (2006.01)

(52) U.S. Cl.
CPC ............ *F16K 17/16* (2013.01); *F16L 23/003* (2013.01); *F16L 23/006* (2013.01); *F16L 23/16* (2013.01)

(58) Field of Classification Search
USPC ................. 285/1–3, 368, 901, 917, 260, 23; 277/608–609, 616, 626
See application file for complete search history.

(56) References Cited

U.S. PATENT DOCUMENTS

| 3,480,301 A * | 11/1969 | Kroening | F16L 23/18 |
| | | | 277/609 |
| 3,730,537 A * | 5/1973 | Ward et al. | 277/314 |
| 3,781,043 A | 12/1973 | Hagmann | |
| 3,899,012 A * | 8/1975 | Sather | 141/331 |
| 4,073,402 A * | 2/1978 | Wood | 220/203.08 |
| 4,095,809 A | 6/1978 | Smith | |
| 4,751,938 A | 6/1988 | Kerns et al. | |
| 4,898,494 A * | 2/1990 | Ellis | 404/2 |
| 5,437,482 A * | 8/1995 | Curtis | 285/148.13 |
| 2001/0052358 A1 | 12/2001 | Cullinane et al. | |
| 2003/0213522 A1 | 11/2003 | O'Shea | |

FOREIGN PATENT DOCUMENTS

EP    0 921 343 A    6/1999
GB    1 311 054 A    3/1973

OTHER PUBLICATIONS

Flowserve Gestra valve installation guide for RK model products, pp. 1-44; See English language version, pp. 10-17. Available from www.gestra.com.
Extended European Search Report for EP Appln. No. 05775583.7-2424 / 1800042 PCT/US2005026400 (counterpart to U.S. Appl. No. 10/936,761), dated Mar. 17, 2009 (10 pages).

* cited by examiner

*Primary Examiner* — Aaron Dunwoody
*Assistant Examiner* — Fannie Kee
(74) *Attorney, Agent, or Firm* — Finnegan, Henderson, Farabow, Garrett & Dunner, LLP

(57) ABSTRACT

A flange adapter is provided for positioning an insert device within a pressurized fluid system. A flange adapter assembly includes a pressure containing boundary and a flange adapter configured to be selectively connected to the pressure containing boundary. The adapter is configured to interchangeably fit a plurality of flange standards for the same nominal size. The adapter may also interchangeably fit a plurality of pressure ratings for the same nominal size. The flange adapter may be manufactured separate from the pressure containing boundary to allow for utilizing less costly material and to increase standardization of safety heads. The present invention also includes a gasket design having multi-flange compatibility for use in pressurized fluid systems.

49 Claims, 15 Drawing Sheets

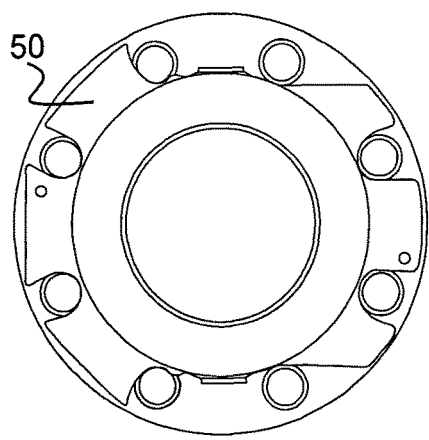
FIG. 5E
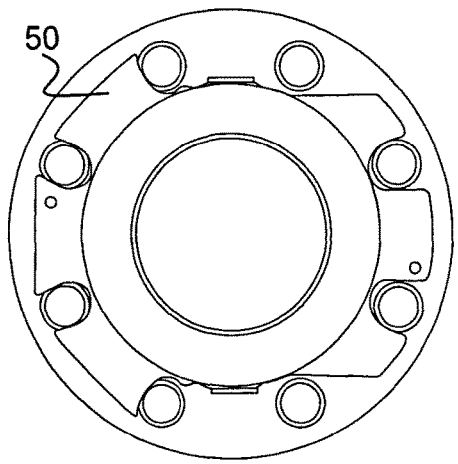 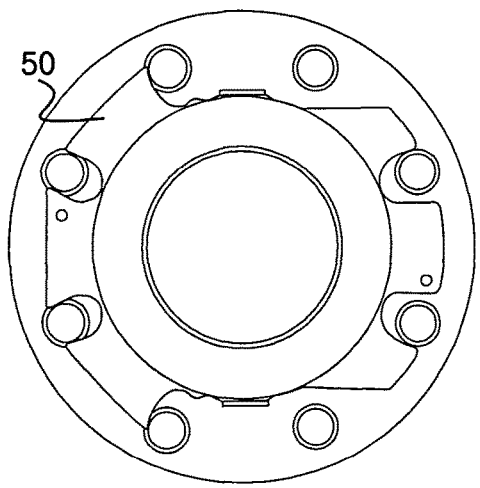
FIG. 5F  FIG. 5G

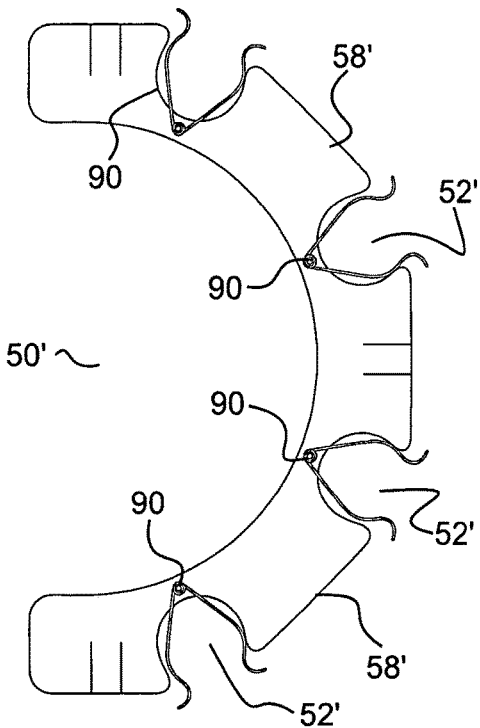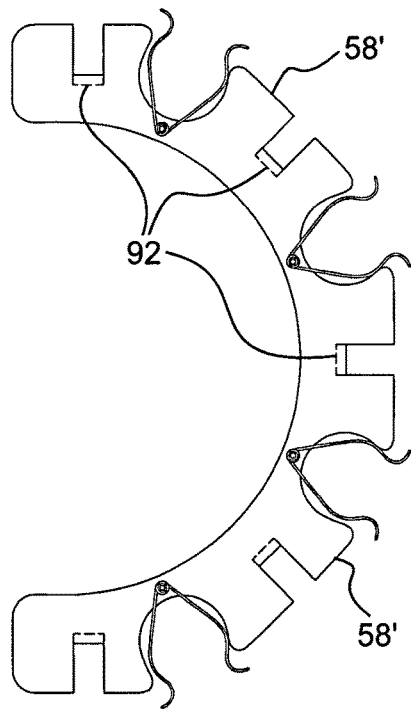
FIG. 8A  FIG. 8B
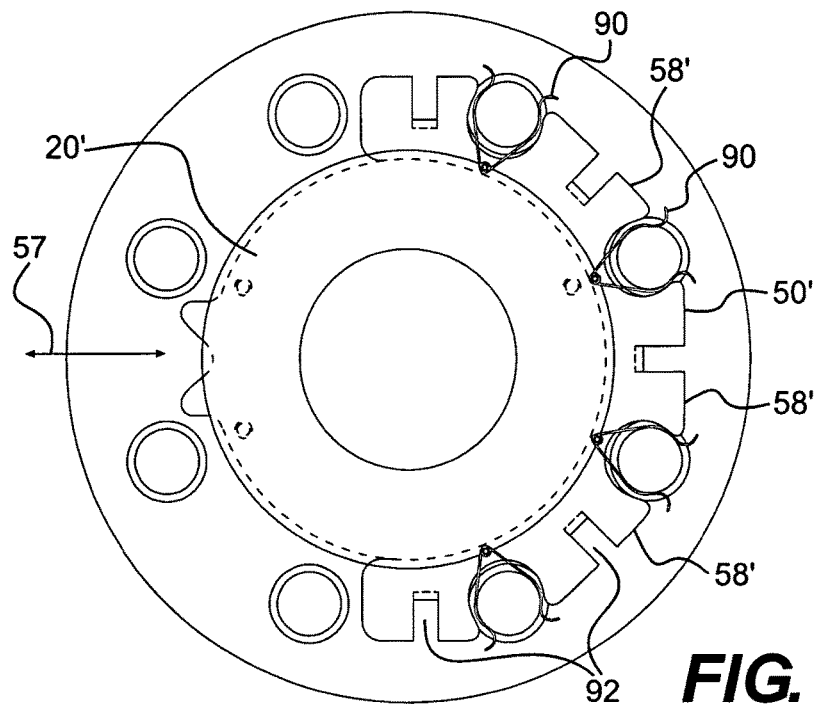
FIG. 9

FLANGE ADAPTER

FIELD OF THE INVENTION

This invention relates to a coupling assembly for pressurized fluid systems, and more particularly to a flange adapter device for coupling within bolted flange members.

BACKGROUND OF THE INVENTION

In pressurized fluid systems or vessel components, pipe flanges are used to connect and seal adjoining pipe sections. In many systems containing pressurized fluids, additional insert devices are installed by means of an internal placement within the bolting pattern of exterior companion pipe flanges. These insert devices have a particular function depending upon the specific application of the underlying system. Representative examples of insert devices for placement within pressurized fluid systems include, but are not limited to, rupture disks, steam traps, check valves, and orifice plates. For example, a rupture disk will vent fluid from the system when the pressure in the system reaches an unsafe level. A number of emergency conditions, including fire and system failure, can create dangerous pressure levels, which require immediate relief to preserve the safety of the system.

Generally, a pressure relief assembly includes a rupture disk that is associated upon installation with a unitary, single member holder or sealed between a pair of such support members, or safety heads. The pressure relief assembly is then sealingly disposed between a pair of conventional pipe flanges in a conduit of the pressurized system. One side of the conduit conducts pressurized fluid to one side of the pressure relief assembly, and the other side of the conduit pipe provides an outlet to a safety reservoir or to the environment. The support members include a central opening that exposes a portion of the rupture disk to the pressurized fluid in the system. The exposed portion of the rupture disk will rupture when the pressure of the fluid reaches a predetermined differential pressure between the inlet and outlet sides. The ruptured disk creates a vent path that allows fluid to escape through the outlet to reduce the pressure in the system.

In an emergency situation, where the system pressure becomes unsafe, it is important to reduce the pressure as quickly as possible. The American Society of Mechanical Engineers (ASME) codes establish minimum performance requirements for fluid flow through pressure relief systems. The size and shape of the opening created when the disk bursts is a limiting factor on the rate at which fluid can escape the system. A burst disk having a large, unobstructed opening will perform better than a burst disk having a small, obstructed opening because the velocity head loss (i.e. pressure drop) over the large, unobstructed opening will be lower than the velocity head loss over a smaller or obstructed opening. The lower velocity head loss translates to a lower flow resistance ($K_r$) and, thus, a greater flow rate through the disk device.

Another factor which affects flow resistance of the system is the positioning of the pressure relief assembly with respect to the companion bolted flanges. If the pressure relief assembly is precisely centered within the bolted flange members, the path created when the disk bursts will more consistently lead to a larger and less obstructed opening. Conversely, where an insert device is positioned in an off-center manner, the velocity head loss over this smaller opening will create a larger pressure drop that may create an undesirable situation.

As mentioned above, many insert devices are installed into pressure systems by means of conventional pipe flanges. Conventional pipe flanges are constructed according to standardized guidelines. In the United States, pipe flanges are produced according to standards provided by the American National Standards Institute (ANSI) and the American Society of Mechanical Engineers. ANSI and ASME standards require that for a particular nominal size and pressure rating, the particular flange has standard specifications regarding such factors as, the number of bolts, the size of bolt holes, bolt spacing, and flange overall dimensions. Conversely, in other countries different standards are used. In Germany, for example, flanges are constructed according to the German Industrial Norm (DIN). Japan uses the Japanese Industrial Standard (JIS). Great Britain uses the BS Standard. The European Union has introduced EN standards for pipe flanges.

These design standards differ in that each standard requires a distinct bolt pattern and normally circular flange configuration corresponding to a particular pressure rating and nominal size. Accordingly, due to the difference in international flange design standards, a pressure relief assembly will require individualized positioning within a particular system depending upon the particular flange standard used. These differences require that assemblies, such as safety heads or the insert device itself in instances where the holder is integral to the insert device, be individually manufactured to fit the specific flange standard for which they are to be ultimately installed. In addition, traditional gaskets used for creating fluid tight seals in pressurized systems must also be specifically fit for particular flange sizes and international standards.

In light of the foregoing, there is a need for a flange adapter that allows for the positioning and centering of an insert device or gasket within companion bolted flanges of differing design standards and pressure ratings. It would be desirable from a cost-effectiveness standpoint to have a flange adapter that could be manufactured from inexpensive materials, such as bar stock or sheet material.

Insert devices and gaskets placed within a pressurized fluid system often require strict maintenance and inspection for proper performance and replacement. Devices inserted within pressurized fluid systems often are cumbersome to remove from within companion bolted flange members. This process requires the removal of multiple bolts to reach the insert device or gasket followed by re-installation and precise torqueing between the flange members. Accordingly, there is also a need for an adapter device which facilitates removal and reassembly of insert devices and gaskets from within bolted flange members within a pressurized fluid system.

Different aspects of the present invention provide a solution to each of these identified problems.

SUMMARY OF THE INVENTION

A flange adapter is provided for positioning an insert device within a pressurized fluid system. The flange adaptor assembly includes a pressure containing boundary and a flange adapter configured to be selectively connected to the pressure containing boundary. The adapter is configured to interchangeably fit a plurality of flange standards for the same nominal size. The adapter may also interchangeably fit a plurality of pressure ratings for the same nominal size. The flange adapter may be manufactured separate from the pressure containing boundary to allow for using less costly material and to increase standardization of safety heads. Alternatively, the flange adapter may be formed integral with the underlying insert device without the use of a separate pressure containing boundary. Certain embodiments of the invention provide for a specific shape of the recesses of the adapter that mate with the bolts to allow for removal of an assembly from within companion pipe flanges without removal of all of the bolts. In addition, the present invention is directed to a gasket design configured to interchangeably fit a plurality of flange standards for the same nominal size. The gasket may also interchangeably fit a plurality of pressure ratings for the same nominal size.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIGS. 5A-5G are top plan views of a flange adapter juxtaposed with flanges of differing standards and pressure ratings.

FIGS. 8A-8B are top plan views of an alternative adapter ring embodiment according to the invention.

FIG. 9 illustrates the adapter of FIGS. 8A-8B and an insert device positioned within the bolting pattern of a flange within a pressurized system.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 1:
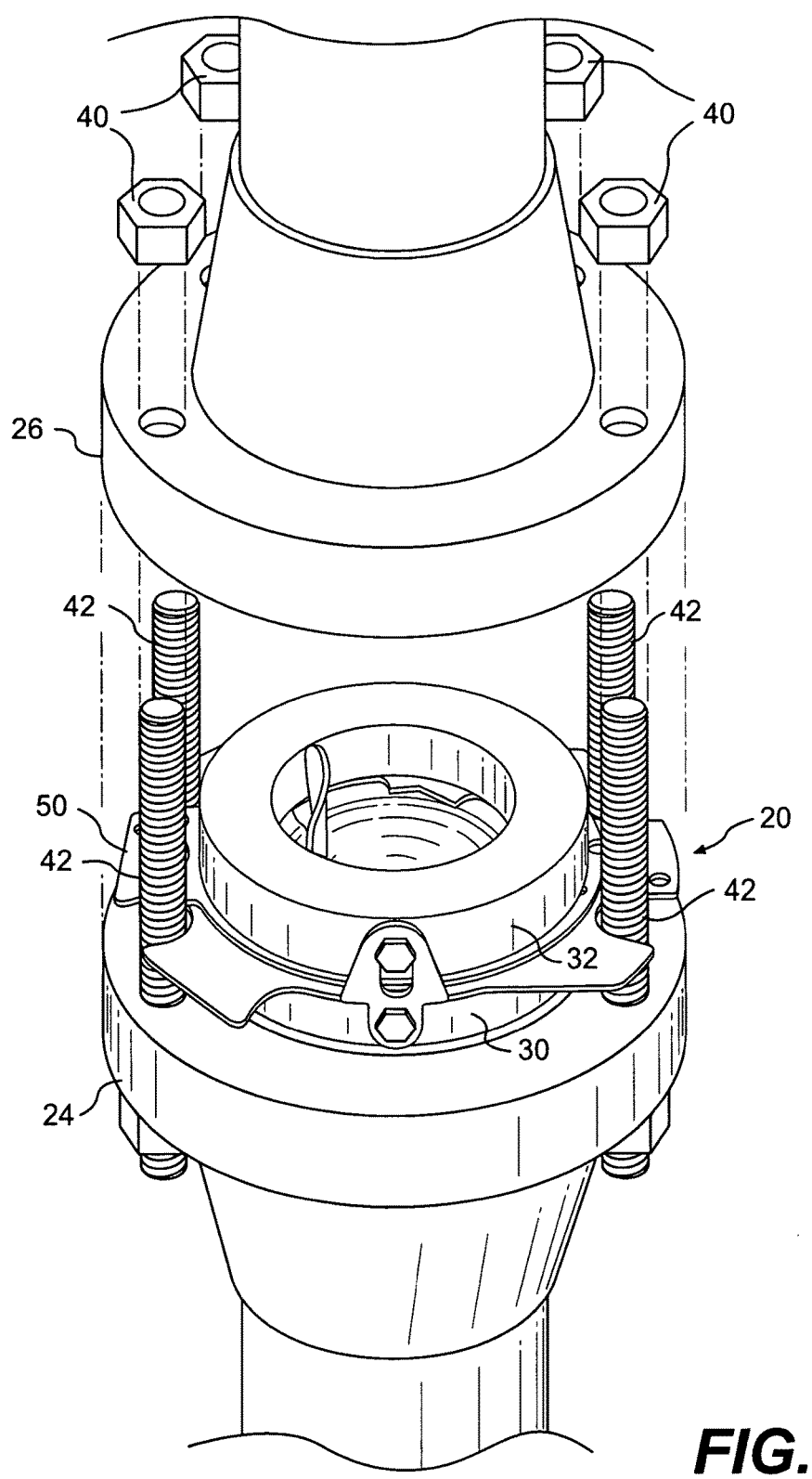
FIG. 1 illustrates a perspective view of a pressure relief assembly including a flange adapter being installed within companion pipe flanges.

FIG. 1 depicts a safety head assembly, generally represented by number 20, installed between companion bolted flange members, 24, 26. Inlet pipe flange member 24 and outlet pipe flange member 26 will connect the pressure relief assembly within the flow path of a pressurized fluid system. The example of FIG. 1 shows a safety head assembly, including an inlet safety head member 30 and an outlet safety head member 32. The safety head assembly 20 may act as a holder or support member for any number of insert devices for placement within a pressurized fluid system. The safety head assembly 20 is installed into the pressurized fluid system by means of compression between inlet pipe flange 24 and outlet pipe flange 26. This compression is achieved by applying torque to nuts 40 associated with bolt members 42. In the context of rupture disk pressure relief assemblies, the centering of the pressure relief assembly 20 within a pipe system and between bolted pipe flange members 24 and 26 helps reduce the amount of flow resistance ($K_r$) upon rupture disk activation and opening.

A flange adapter 50 is shown positioned within the pressurized fluid system seated between the inlet safety head member 30 and the outlet safety head member 32. Inlet and outlet pipe flange members 24 and 26, inlet and outlet safety head members 30 and 32, and flange adapter 50 all include central bores for allowing flow therethrough. Flange adapter 50 is associated with the safety head assembly 20 for providing multi-flange compatibility, as well as centering of the entire assembly 20 when installed within companion bolted flange members 24 and 26.

As set forth above, precise centering of an insert device, such as a rupture disk, will help assure its proper performance. When ultimately installed within the pressurized system, the inlet and outlet safety head members 30 and 32 act as pressure containing boundaries in association with an insert device seated therein. The flange adapter 50 may provide a means of precisely centering the safety head assembly 20 by aligning the companion flange bolt members 42 within the flange adapter's template design.

The flange adapter 50 may be distinct from the safety head members 30 and 32 that act as pressure containing boundaries. Therefore, the position of the flange adapter relative to the safety head assembly 20 is not limited. Accordingly, the flange adapter 50 may be placed between the safety head members 30 and 32. Alternatively, the flange adapter 50 may be positioned above or below the safety head assembly 20, or may be formed integral therewith. The positioning of the flange adapter 50 relative to the associated safety head assembly does not limit the effectiveness with which it centers safety head assembly 20.

Figure 2:
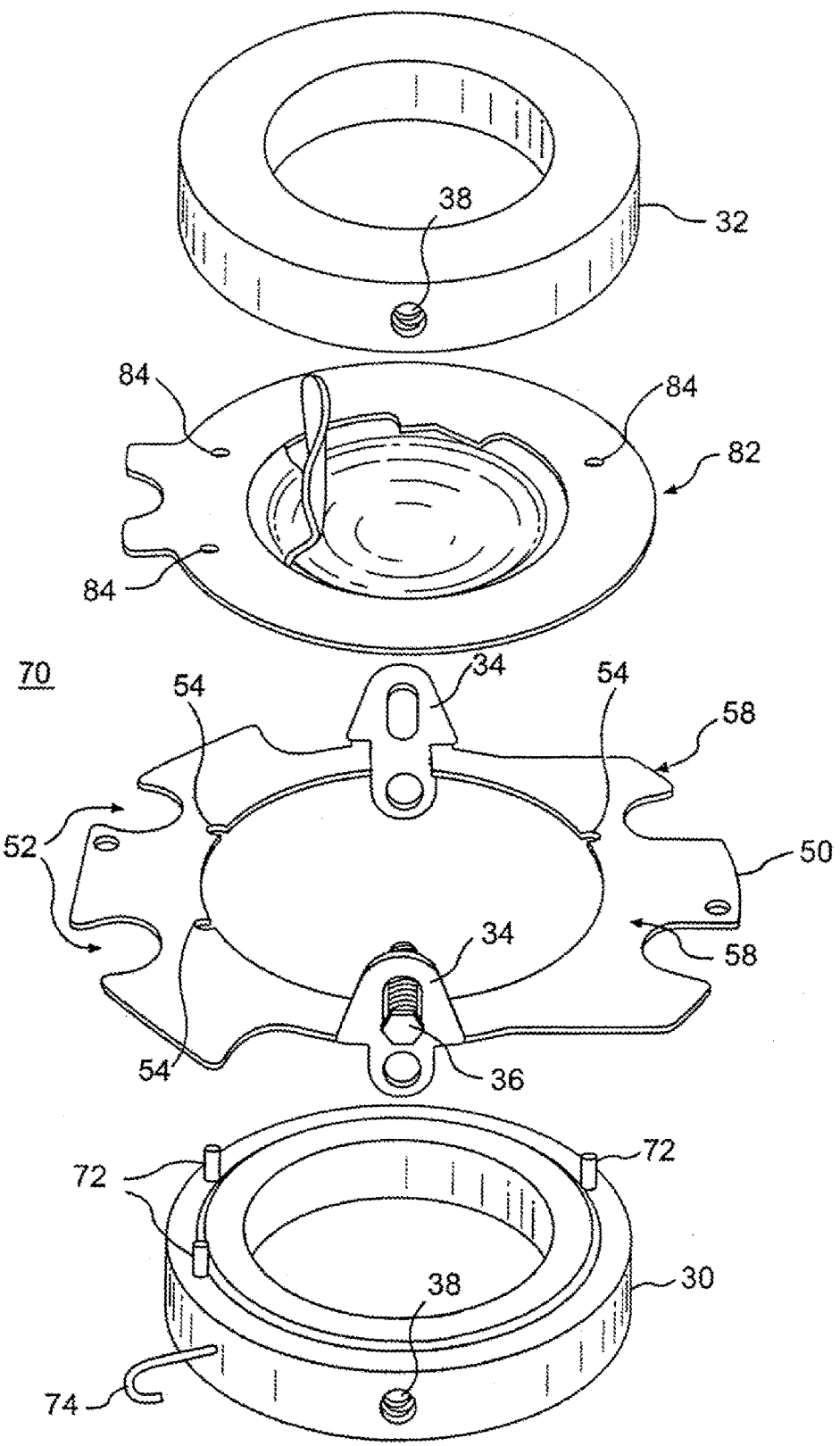
FIG. 2 is an exploded view of a flange safety head assembly including a rupture disk and a flange adapter.
Figure 12:
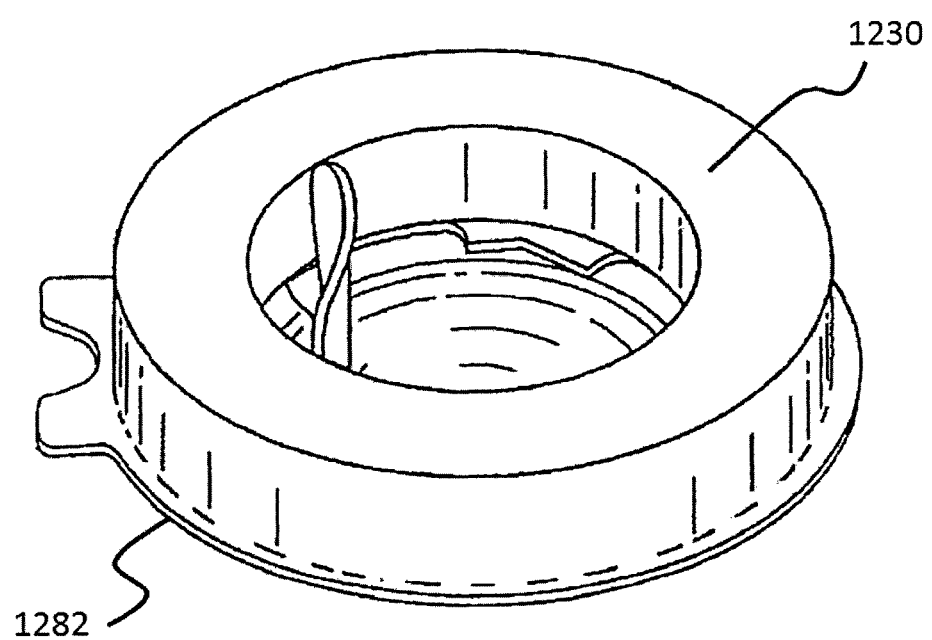
FIG. 12 illustrates a perspective view of a rupture disk and safety head member.

FIG. 2 illustrates an exploded view of a pressure relief assembly 20, including a rupture disk 82. In a preassembled safety head design, the inlet safety head member 30 and outlet safety head member 32 are maintained as a loosely connected or preassembled unit to facilitate installation and on-site handling. Alternatively, the pressure relief assembly may be pre-torqued to sealingly connect the components before installation in pipe flanges. Although FIG. 2 illustrates a rupture disk 82 and safety head member 30 being provided as separate components, a rupture disk 1282 and safety head member 1230 may alternatively be provided as a unitary single piece unit as illustrated in FIG. 12.

Figure 3:
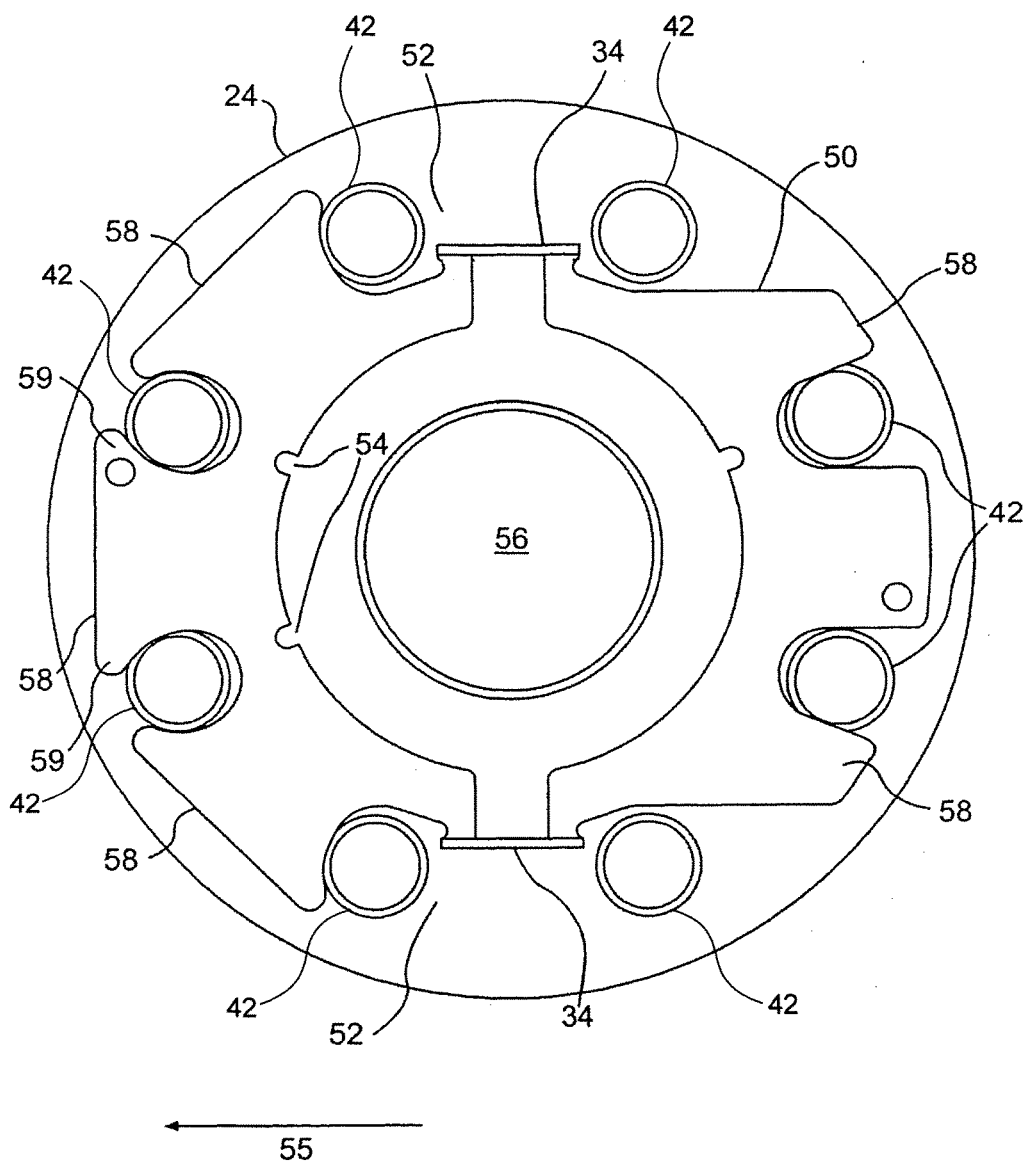
FIG. 3 illustrates a top plan view of a flange adapter as applied to a typical 8 bolt companion flange.
Figure 4A:
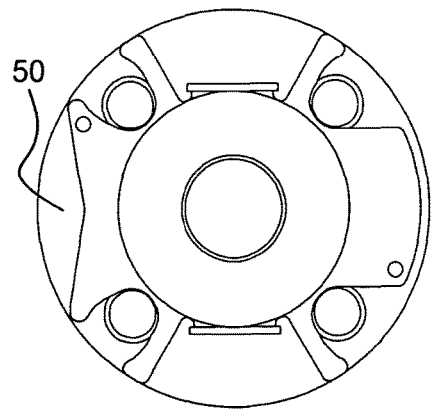
FIGS. 4A-4F are top plan views of a flange adapter juxtaposed with flanges of differing standards and pressure ratings.
Figure 4B:
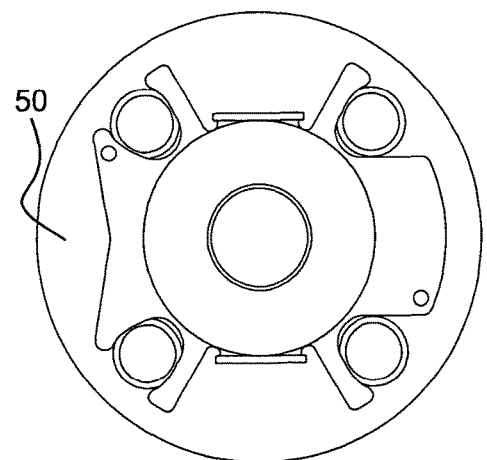
Figure 4C:
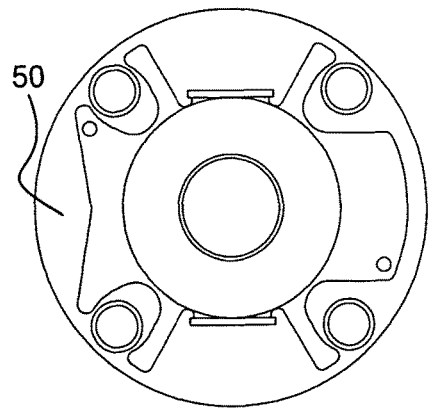
Figure 4D:
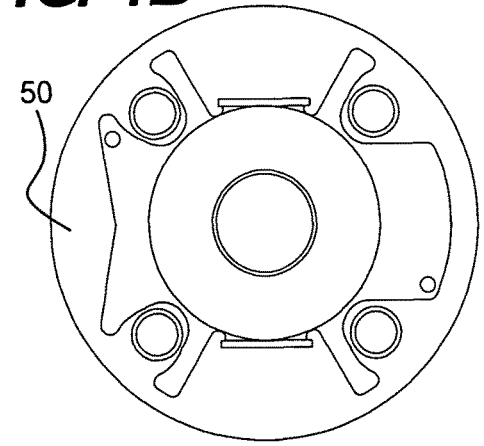
Figure 4E:
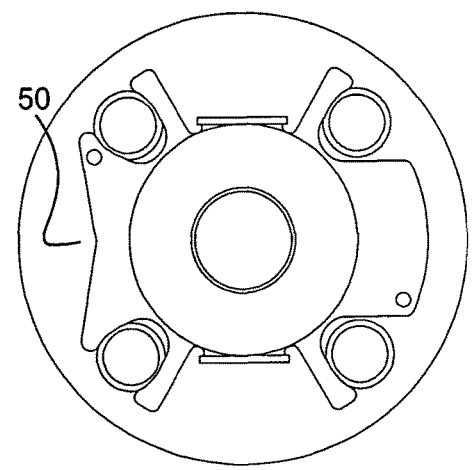
Figure 4F:
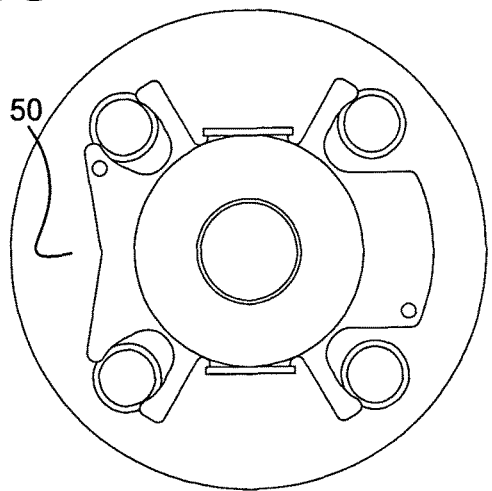
Figure 5A:
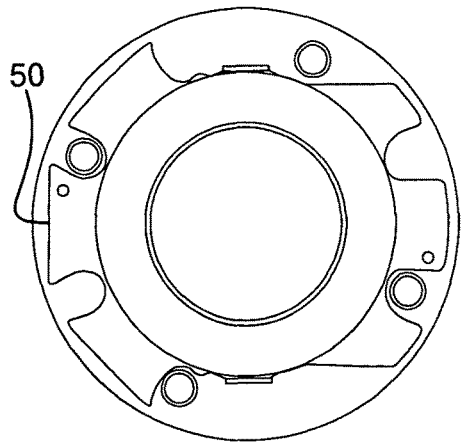
Figure 5B:
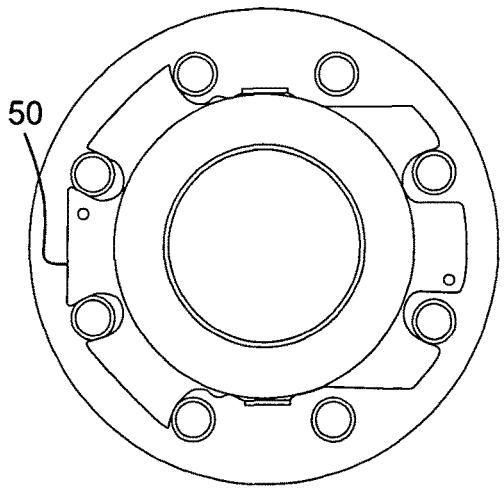
Figure 5C:
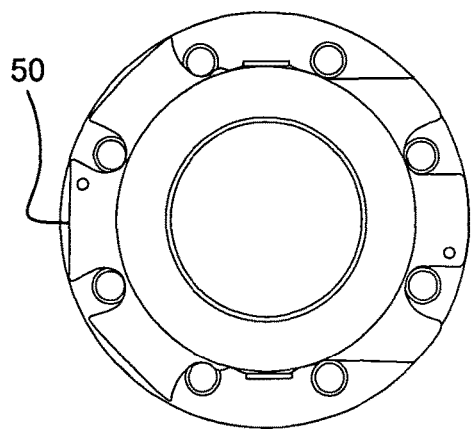
Figure 5D:
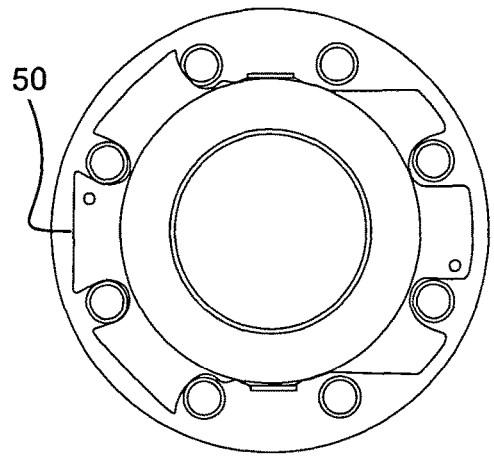
Figure 6A:
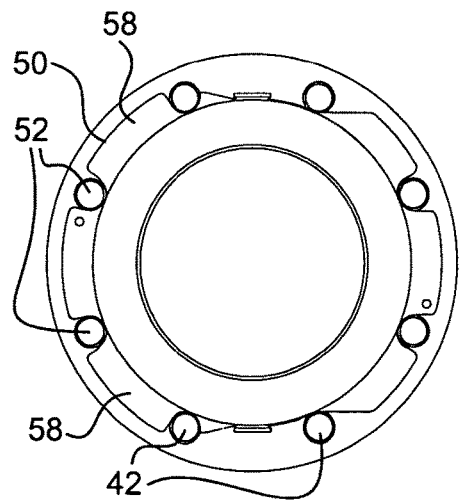
FIGS. 6A-6H are top plan views of a flange adapter juxtaposed with flanges of differing standards and pressure ratings.
Figure 6B:
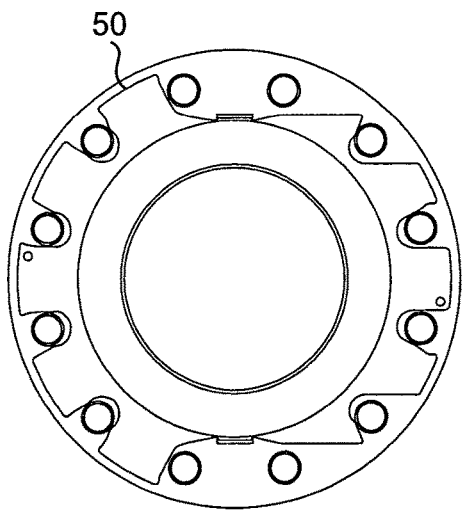
Figure 6C:
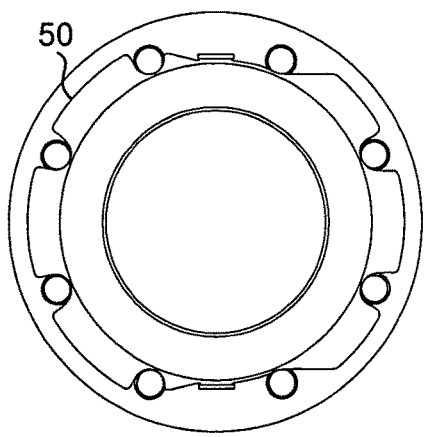
Figure 6D:
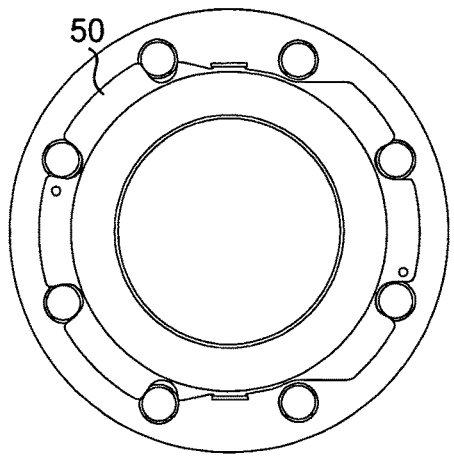
Figure 6E:
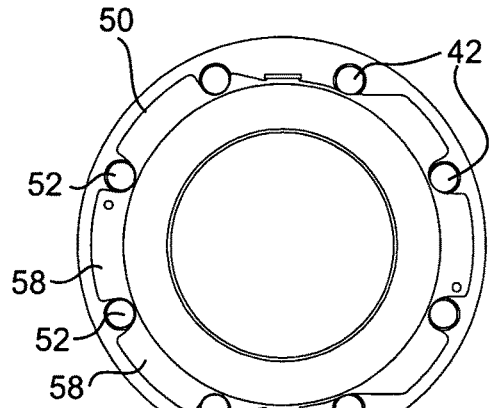
Figure 6F:
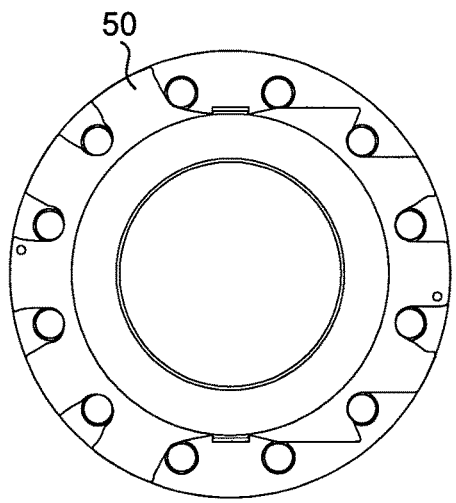
Figure 6G:
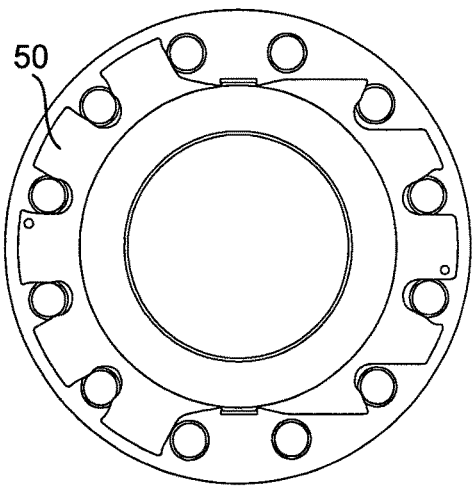
Figure 6H:
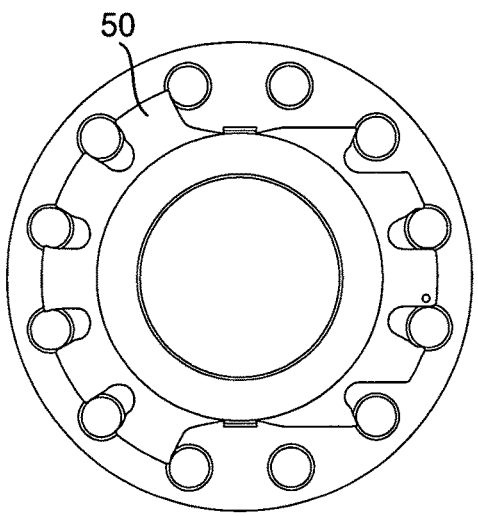

FIG. 3 illustrates a top plan view of another embodiment of a flange adapter. The adapter 50 is shown seated upon an inlet pipe flange member 24. Inlet pipe flange member 24 is of a standard, size, and pressure rating requiring 8 bolt members 42. The flange adapter 50 may align and center a safety head (not shown) by means of the design template, which includes bolt recesses 52. The flange adapter includes a central bore 56 for allowing fluid passage therethrough when installed within a pressurized fluid system. The central bore 56 may give the flange adapter an exterior ring-like shape. The central bore may follow the bore of the safety head or companion flanges or be larger such that a safety head raised sealing face may be accommodated inside the adapter ring. Bolt recesses 52 may be formed on an exterior perimeter of the adapter 50. Locating pin recesses 54 may be formed along the edge of the central bore 56 to accommodate this pin feature that is typically used to control the centering and direction of installation of the rupture disk within its holder.

The design template of the flange adapter 50 locates the bolt recesses 52 to correspond to the bolt pattern of the inlet and outlet pipe flange members within which it will be installed. Each recess 52 may be spaced a predetermined distance from the center of central bore 56 in order to promote the closer alignment of the central bore 56 and the conduit of the flange members, when the recesses 52 receive the corresponding bolts 42. Protrusions 58 are formed between the spaced bolt recesses 52 and cooperate with the inlet and outlet pipe flange member bolts 42 to provide centering of the flange adapter 50 and safety head assembly 20.

The flange adapter 50 may also include rounding finishes for protrusions 58 to facilitate safe handling. Additionally, the thickness of adapter 50 may be selected to avoid the annoyance of sharp edges and to provide a desired damage resistance.

The geometry of adapter 50 may be asymmetrical with respect to the right and left sides of the device. The protrusions 58 appearing on the left half (as seen in FIG. 3) include outwardly extending flares 59. These flares 59 more captively enclose the bolt members 42, than do the corresponding protrusions 58 appearing on the right half (as seen in FIG. 3) of the flange adapter 50. The practical result of this feature facilitates the removal of the adapter 50 (as well as safety head assembly 20) from between the inlet and outlet pipe flange members. As seen in FIG. 3, arrow 55 represents the removal direction of the adapter 50 and safety head assembly 20 when four bolt members 42 are removed from the left side of inlet pipe flange member 24.

After original installation, gaskets and their piping systems and insert devices such as rupture disks will require maintenance and safety checks in order to assure proper performance. The asymmetrical design represented in FIG. 3 allows withdrawal of the entire assembly from between the pipe flange members upon the removal of less than all of the bolt members 42. In this particular design, only the four bolts on the left side of the device need to be removed for withdrawal of the assembly. Accordingly, with the asymmetrical adapter design, the number of bolt members 42 required to be removed for withdrawal is significantly reduced. In order to achieve this advantage, it is not necessary that all recesses be identical on a given side of the adapter. Rather, it is necessary only that selected recesses be shaped to engage a bolt in a manner that allows disengagement without removal of the bolt.

Side lugs 34 may be formed integrally with the flange adapter 50 as seen in FIG. 2. The side lugs extend in a plane substantially perpendicular to the rest of flange adapter 50. Side lugs 34 allow pre-assembly of the inlet and outlet safety head members 30,32 by means of connecting capscrews 36 through the side lugs 34 into corresponding cap screw holes 38 in the outlet safety head member 32. Pressure relief assembly 70 may further include a flange adapter 50 including location pin recesses 54 (as seen in FIG. 3) for mating with locating pins 72 of inlet safety head member 30.

In order to assure proper performance of an insert device, such as the rupture disk 82, there should be a sealing enclosure of the insert device within the pressurized fluid system. In a pre-assembled design, this sealing can be provided by the mating of companion inlet and outlet pipe flange members 24 and 26. A pre-assembled design differs from a pre-torqued safety head design where inlet and outlet safety head members independently provide a sealing enclosure of an insert device, such as by means of cap screws tightened axially therebetween.

As further seen in FIG. 2, a preassembled pressure relief assembly 70 may be constructed to include locating pins 72, which extend from inlet safety head member 30 and through corresponding holes 84 in rupture disk 82. Locating pins 72 also mate with corresponding holes (not shown) in the underside of outlet safety head member 32 and locating pin recesses 54 of adapter 50 to form a completed assembly for installation. A J-shaped positioning fixture 74 may extend from inlet support member 30 and engage an opening within the inlet pipe flange 24 (FIG. 1 illustrates inlet pipe flange 24) to ensure preassembled pressure relief assembly 70 is properly oriented between the inlet and outlet pipe flange members 24 and 26. J-shaped positioning fixture 74 may also ensure that inlet support member 30 is placed adjacent inlet pipe flange 24 and, thus, prevents preassembled pressure relief assembly 70 from being installed upside down within the pressurized fluid system.

Figure 13:
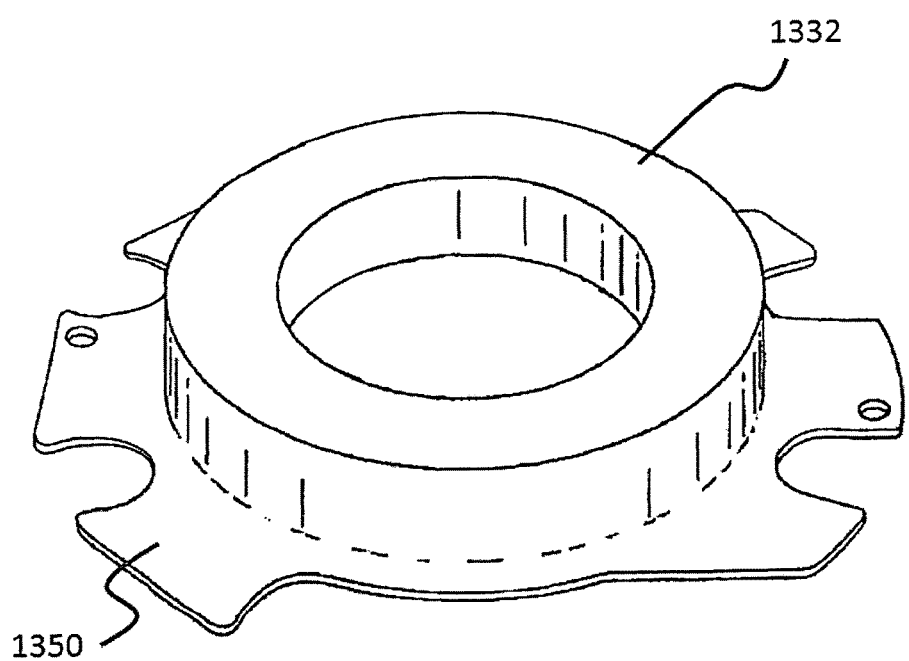
FIG. 13 illustrates a safety head member and a flange adapter.
Figure 14:
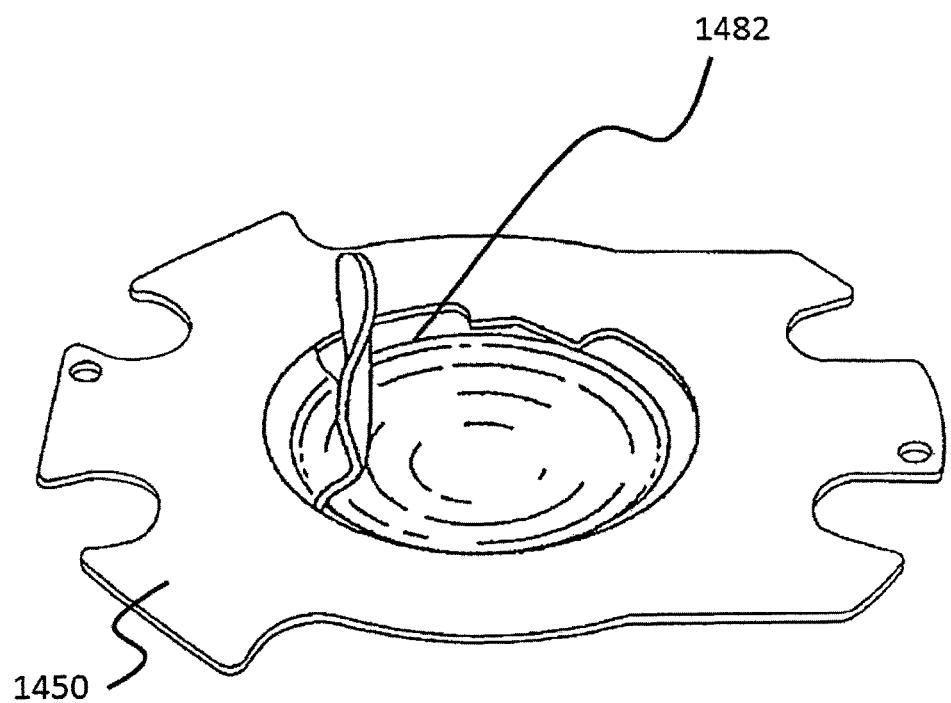
FIG. 14 illustrates an adapter formed integrally with a rupture disk.

The flange adapter 50 can be manufactured independent from the inlet and outlet safety head members 30 and 32, thereby providing potential cost saving to a manufacturer. While it is often necessary to use expensive materials when forming the safety heads to meet code or other requirements, the adapter may potentially be made from inexpensive bar stock or sheet material. Moreover, the adapter can be manufactured cost effectively through, inter alia, a stamping process that provides significant cost savings in comparison to casting, machining or similar techniques. The adapter may be subsequently connected to the safety head assembly, perhaps even through permanent means, such as through welding, crimping, or adhesive bonding, as illustrated in FIG. 13. As shown in FIG. 13, a safety head 1332 is permanently connected to an adapter 1350. In another embodiment, illustrated in FIG. 14, an adapter 1450 may be formed integrally with an insert device (e.g., rupture disk 1482), with the adapter formed along an exterior perimeter of the insert device. Nonetheless, in some situations the ability to manufacture the component separately provides significant advantages over an adapter that is formed integrally with a safety head or integrally with an underlying insert device.

The economic advantages obtained through manufacturing an adapter independent from the underlying insert device (or the underlying safety head) can be expanded to benefit almost all types of equipment intended for installation within a system between companion pipe flanges. Equipment installed between flanges is often manufactured having a full-face configuration. A full-face configuration is one where an outer area of the actual installed device includes apertures wholly formed therein for receiving the flange bolts. Upon placement within the system, the underlying piece of equipment is properly positioned when the flange bolts extend through the apertures formed in the device.

The present invention contemplates the use of an adapter having apertures wholly formed therein for use with an associated insert device or other flange-based equipment.

Figure 11:
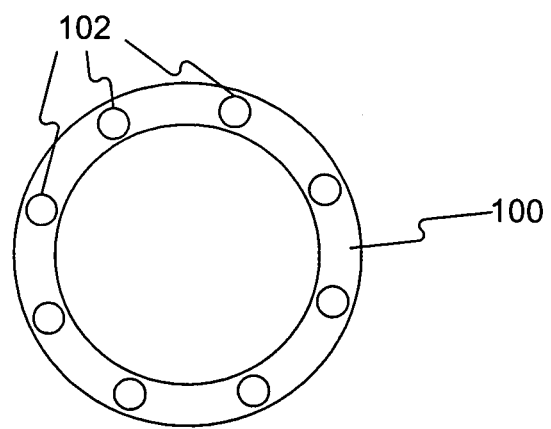
FIG. 11 illustrates a top plan view of an additional adapter ring embodiment according to the invention.

FIG. 11 illustrates an independent adapter ring 100. Adapter ring 100 includes apertures 102 wholly formed therein. The adapter ring 100 includes a central bore and is intended to be combined with an underlying flange insert device or safety head (not shown) to achieve proper positioning within the system. The central bore imparts to the adapter ring 100, an exterior perimeter boundary and an interior perimeter boundary. The apertures 102 as illustrated are formed wholly within the adapter ring 100 between the interior perimeter and the exterior perimeter and are evenly spaced around the circumference of the ring.

The use of an independent positioning adapter ring 100 allows the underlying insert device to be manufactured without the additional costs and materials required by a traditional full-face configuration. Considerable cost savings can be achieved by eliminating the need for every underlying insert device to incorporate a full-face positioning structure.

The adapter ring 100 may be formed to correspond to a particular international flange standard and a particular pressure rating bolt pattern. Alternatively, the overall shape of the flange adapter ring 100, the spacing of the apertures 102, and the size of apertures 102 may be selected to provide the advantage of interchangeability with a variety of different standards and/or pressure ratings for a given nominal size.

The flange adapter 50 of FIGS. 1-3 and the adapter ring 100 can be combined with the safety head assembly 20 (or the actual insert device) by any number of ways. The adapter can be attached to the safety head assembly by conventional attachment components such as welding, crimping, adhesive bonding, and single use screws. For example, the flange adapter may be permanently connected to the pressure containing boundary after manufacture and before installation within the pressurized fluid system. Additionally the present invention can employ temporary attachment means to perform the connection between the adapter and the safety head assembly 20. Representative examples of temporary attachment means include spring clip connection devices, press fitting positive force attachments (e.g. machining a close fit between the adapter and safety head), and releasable screws.

The template design of the flange adapter may be selected to provide the advantage of interchangeability with a variety of different standards and/or pressure ratings for a given nominal size. With reference to FIGS. 4A-4F, there is disclosed a single flange adapter 50 having a design template compatible with each flange corresponding to FIGS. 4A-4F each having differing pressure ratings and constructed according to differing international standards. The flanges represented in FIGS. 4A-4F all correspond to a 1" nominal size flange. The flange adapter 50 includes bolt recesses corresponding to the four bolt configuration of the illustrated flanges. For this particular nominal size, the universal design of adapter 50 allows a single component to center safety head assemblies within flanges having at least six different bolt patterns. This allows for the manufacture of a standard safety head design compatible with all six flange designs. The standardizing of safety head design is one advantage that may be achieved through the disclosed adapter. The compatibility feature will also provide an additional benefit to the end-user by substantially reducing the amount of inventory necessary to be maintained.

As illustrated in FIGS. 5A-5G and 6A-6H, a flange adapter may be constructed to adapt to larger nominal size flanges as well. FIGS. 5A-5G, represent a flange adapter device 50 compatible with flanges having a 4" nominal size. FIGS. 6A-6H represent a flange adapter device 50 compatible with flanges having a 6" nominal size. Additional bolt members are sometimes required for flanges having a larger nominal size. Accordingly, the flange adapter 50 may include an increased number of protrusions 58 and bolts recesses 52 to cooperate with the bolt members 42.

Table 1 below represents the compatibility of the flange adapter 50 according to varying nominal sizes of pipe flanges. Table 1 includes representations of the particular flange pressure ratings and national standards corresponding to the different flanges depicted in FIGS. 4A-4F, 5A-5G, and 6A-6H.

TABLE 1

| Nominal Size | FIG. # | National Standard | Pressure Rating |
| --- | --- | --- | --- |
| 1" Nominal Size (FIG. 4) | 4A | ANSI/ASME | 150 |
| | 4B | ANSI/ASME | 300; 600 |
| | 4C | BS | 10 |
| | 4D | DIN/EN | 10; 16; 25; 40 |
| | 4E | JIS | 10; 16; 20 |
| | 4F | JIS | 30; 40 |
| 4" Nominal Size (FIG. 5) | 5A | ANSI/ASME | 150 |
| | 5B | ANSI/ASME | 300 |
| | 5C | DIN/EN | 10; 16 |
| | 5D | DIN/EN | 25; 40 |
| | 5E | JIS | 16; 20 |
| | 5F | JIS | 30 |
| | 5G | JIS | 40 |
| 6" Nominal Size (FIG. 6) | 6A | ANSI/ASME | 150 |
| | 6B | ANSI/ASME | 300 |
| | 6C | DIN/EN | 10; 16 |
| | 6D | DIN/EN | 25; 40 |
| | 6E | JIS | 10 |
| | 6F | JIS | 16; 20 |
| | 6G | JIS | 30 |
| | 6H | JIS | 40 |

The construction of the flange adapter 50 allows for both the precise insert device centering and a standardized universal design. In order to reach an optimal balance between these goals, there will occasionally be a range of variation with respect to the precise level of centering depending upon the particular flange rating.

Figure 7A:
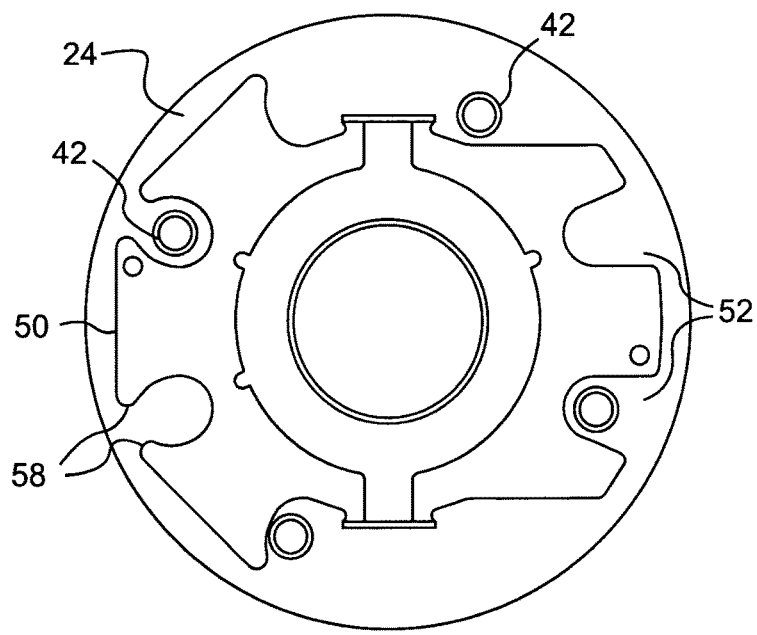
FIGS. 7A-7B are top plan views of an adapter being installed on a pipe flange.
Figure 7B:
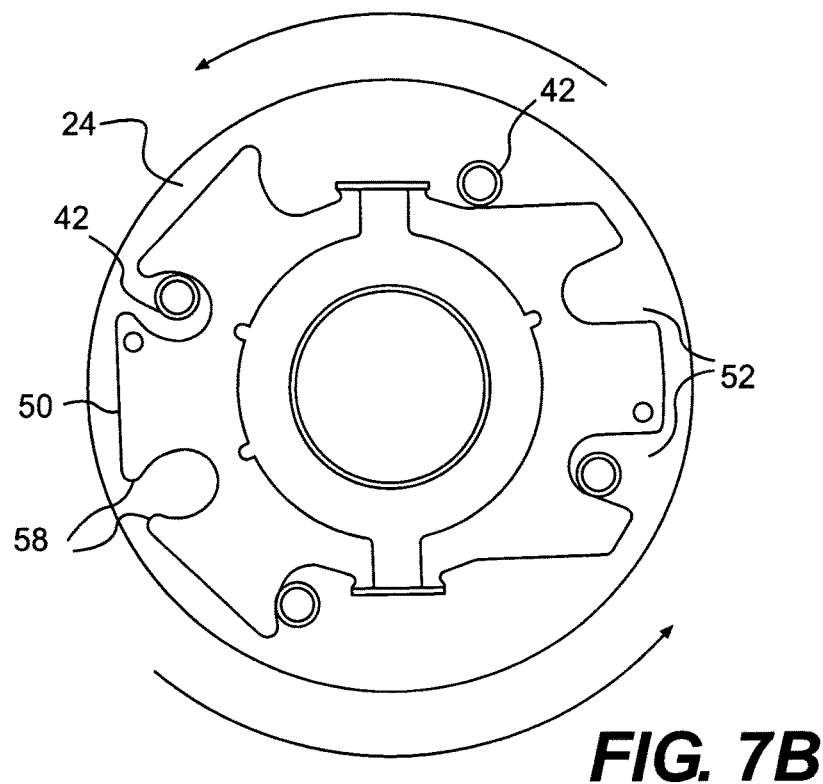

FIGS. 7A-7B disclose an additional aspect of the flange adapter. In certain flange geometries such as the one represented in FIGS. 7A-7B, the adapter device 50 will have a design tolerance which results in a looser fit with a pipe flange. In such an instance, more precise centering can still be accomplished. As seen in FIG. 7B, the user may simply rotate the adapter 50 (and an associated attached safety head assembly) until contact is made with the bolt members 42. Once contact is made, the first and second pipe flange members 24 and 26 can be firmly bolted together thereby providing a more precisely centered safety head assembly 20 (an example of a safety head assembly 20 is depicted in FIG. 1). The end result will then resemble the configuration represented in FIG. 1. In FIG. 7A and 7B second flange 26 is removed for clarity.

The particular spacing of the adapter bolt recesses 52 and protrusions 58 provides for the preferred balance between precise centering and compatibility. This design provides an additional advantage with respect to the system's overall installed orientation. Past safety head assemblies had multiple orientation directions when installed within inlet and outlet pipe flange members 24 and 26. This inconsistency in placement orientation was a consequence of safety head assembly geometries, which could result in distinct orientations depending upon the standard and rating of the system's flanges.

The present invention results in consistent orientation of the installed pressure relief assembly. As seen in FIGS. 7A-7B, the rotation of the installed safety head assembly 20 will be the only potential change in orientation of the system. Such a design will in turn allow for the consistent positioning of accessory devices to access the safety head assembly 20 and the underlying insert device. As a result, any tapped connection to the overall assembly will have a consistent insertion direction. This consistency will promote the overall safety of the system by saving time and preventing the improper installation of additional accessory type devices.

FIGS. 8A, 8B, and 9 illustrate an additional embodiment of a multi-flange compatible adapter. Referring to FIG. 8A, adapter 50' is shown having a partial ring shape. Adapter 50' includes bolt recesses 52' formed on the exterior perimeter and located to correspond to the bolt pattern of pipe flange members within which it will be installed. Protrusions 58' are formed between the spaced bolt recesses 52' and are positioned to cooperate with flange bolt members upon installation between companion pipe flange members. In addition, adapter 50' includes spring clips 90 positioned in alignment with the bolt recesses 52'. The spring clips 90 and bolt recesses 52' are configured for engagement with a portion of the bolting between companion flange members. In configurations involving installation of an insert device in a horizontally situated pressurized system, spring clips 90 provide active engagement with flange bolts and allow an operator's hands to be free for handling additional components during installation and maintenance. Adapter 50' is sized such that upon connection of the adapter 50' with the flange bolting, an insert device may be positioned and centered within the pipe conduit by positioning the external outer diameter of the insert device against the inner diameter of the adapter 50'.

Referring to FIG. 8B, adapter 50' may include tab supports 92 positioned to extend downward in a direction normal to the illustration of FIG. 8B. Tab supports 92 provide a specific height to adapter 50' and are formed to extend normal to the view of FIG. 8B such that upon installation into a flange member, adapter 50' will sit at a predetermined height above the surface of the flange member. This predetermined height is selected to permit contact of adapter 50' with a predetermined corresponding portion of an insert device to assure that the insert device is installed with the proper orientation with respect to the inlet and outlet flow direction of the pressurized system.

FIG. 9 illustrates the installation of adapter 50' upon the surface of a flange member. Recesses 52' and spring clips 90 are shown engaging a number of the bolts of the corresponding flange member. Next an independent insert device or a safety head member designated 20' may be positioned in engagement with the adapter 50'. Arrow 57 of FIG. 9 depicts an exemplary direction of installation for safety head member 20', resulting in engagement of safety head member 20' with adapter 50'. As noted above, the shape of adapter 50', as positioned in relation to the flange member, ensures proper centering of the safety head 20' upon engagement. The inlet side of the safety head member 20', which faces the flange depicted in FIG. 9, may have a smaller diameter than that of the outlet side of the safety head 20' (facing away from the flange of FIG. 9). This configuration ensures that only one end of the safety head member 20' will abut the adapter 50' in a manner that allows the safety head member to locate within the remaining companion flange bolts, thereby providing proper orientation of the safety head 20' within the pressurized system.

As noted above with respect to the previous embodiments, adapter 50' is sized to be compatible for use in flanges of multiple pressure ratings and differing international standards for a particular nominal size. In addition adapter 50' may potentially be made from inexpensive bar stock materials or sheet and can be manufactured cost effectively through a stamping process that provides significant cost savings in comparison to casting or similar techniques.

Figure 10A:
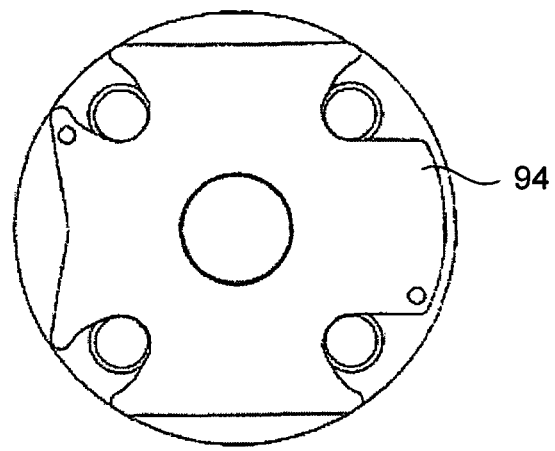
FIGS. 10A-10B illustrate top plan views of different gaskets each shaped to interchangeably fit a plurality of flange standards.
Figure 10B:
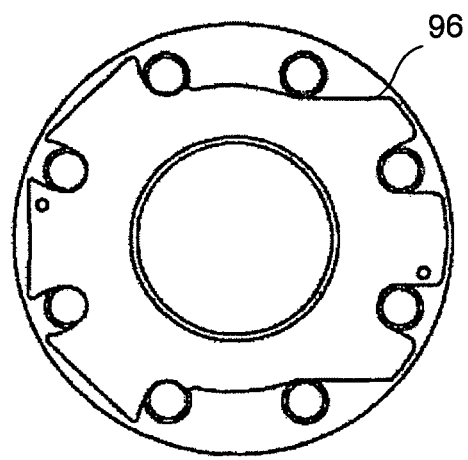

FIGS. 10A and 10B illustrate a multi-flange compatible gasket design according to an additional embodiment of the present invention. Referring to FIGS. 10A and 10B, a one-inch nominal size gasket 94 and a four-inch nominal size gasket 96 are illustrated respectively. Both gaskets 94 and 96 are shown supported on the surface of a pipe flange for use in a pressurized system. Gaskets 94 and 96 are shaped to include bolt recesses and protrusions formed between the recesses to cooperate with flange bolt members. In accordance with the previous embodiments of the present invention, gaskets 94 and 96 are configured for placement within flanges of different pressure ratings and multiple international design standards. Similar to the design of FIG. 3, gaskets 94 and 96 include an asymmetrical design for facilitating removal of the gasket from the flange members. The asymmetrical design includes recesses of a first size and shape on a first side of the gasket and recesses of a second size and shape on a second opposing side of the gasket. The recesses on the left side of the gaskets as illustrated in FIGS. 10A and 10B are configured to more closely surround the corresponding bolts than the recesses on the right side of the gaskets, thereby facilitating a sliding removal of the gaskets from within a pair of flange members, in a direction to the left in FIGS. 10A and 10B, upon removal of less than all bolts.

The gasket design of FIGS. 10A and 10B can be used to facilitate maintenance and removal of gaskets in all pressurized fluid applications utilizing gaskets. In addition, a multi-flange compatible gasket design may be used to install a one piece rupture disk and holder such as a graphite rupture disk machined from solid material. A single gasket design could be used to appropriately seal such graphite rupture disks for use in flanges of varying pressure ratings and international standards.

It will be apparent to those skilled in the art that various modifications and variations can be made in the aforementioned embodiments without departing from the spirit of scope of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A flange adapter assembly, comprising:
an inlet flange member having bolt recesses forming a bolting pattern and a centralized conduit for directing pressurized fluid therethrough;
an outlet flange member having bolt recesses and a centralized conduit for relieving pressurized fluid therethrough, the bolt recesses and centralized conduit of the outlet flange member corresponding with those of the inlet flange member;
a pressure containing member configured to be sealingly engaged between the inlet flange member and the outlet flange member, the pressure containing member further configured to fit entirely within a circle formed by the bolting pattern, the pressure containing member having a cylindrical bore defining a central axis;

an insert device; and a flange adapter configured to be selectively connected to the pressure containing member, the flange adapter having a central opening defining an internal perimeter boundary and an exterior perimeter shaped to exhibit a plurality of recesses therealong, the plurality of recesses being spaced to receive a plurality of different flange bolting patterns for the same size conduit, wherein the flange adapter is configured to align the central axis of the cylindrical bore of the pressure containing member coaxially with a central axis of the fluid flowpath of one or more of the inlet flange member and the outlet flange member; and wherein the flange adapter is configured to align the insert device relative to the central axis of the fluid flowpath of one or more of the inlet flange member and the outlet flange member.

2. The flange adapter assembly of claim 1, wherein the adapter is further configured to fit a plurality of pressure ratings for the same size conduit.

3. The flange adapter assembly of claim 1, wherein the pressure containing member includes:

an inlet safety head defining an inlet bore for conducting a pressurized fluid; and an outlet safety head defining an outlet bore for relieving the pressurized fluid.

4. The flange adapter assembly of claim 3, wherein the flange adapter is positioned on an inlet side of the inlet safety head.

5. The flange adapter assembly of claim 3, wherein the flange adapter is positioned on an outlet side of the outlet safety head.

6. The flange adapter assembly of claim 3, wherein the flange adapter is positioned between the inlet safety head and the outlet safety head.

7. The flange adapter assembly of claim 1, wherein the insert device is configured to be positioned between the inlet flange member and the outlet flange member, and wherein the flange adapter is integral to the insert device and formed along an exterior perimeter of the insert device.

8. The flange adapter assembly of claim 1, wherein the flange adapter is selectively connected to the pressure containing member by screws.

9. The flange adapter assembly of claim 1, wherein the flange adapter is selectively connected to the pressure containing boundary by spring clip fasteners.

10. The flange adapter assembly of claim 1, wherein the insert device is a rupture disk device and wherein the flange adapter is dimensioned such that the adapter aligns a rupture disk opening with at least one of the centralized conduit of the inlet flange member and the centralized conduit of the outlet flange member.

11. The flange adapter assembly of claim 1, wherein none of the recesses forms an aperture located between the internal perimeter boundary and the exterior perimeter of the flange adapter.

12. A flange adapter assembly for positioning an insert device within a pressurized fluid system having a conduit of a size, comprising:

a pressure containing boundary including an inlet safety head defining an inlet bore for conducting a pressurized fluid, the pressure containing boundary further including an outlet safety head defining an outlet bore for relieving the pressurized fluid; and a flange adapter configured to be selectively connected to the pressure containing boundary, the adapter having a central opening defining an internal perimeter boundary and an exterior perimeter defining an exterior perimeter boundary, the exterior perimeter boundary shaped to exhibit a plurality of recesses therealong, the plurality of recesses being spaced to receive a plurality of different flange bolting patterns for the conduit, the flange adapter further including a plurality of protrusions defined by the exterior perimeter boundary of the adapter, the protrusions configured to extend between a plurality of bolts from any of the plurality of different flange bolting patterns;

wherein the flange adapter further includes side lugs formed integrally therewith, the side lugs having a pair of openings aligned with the inlet and outlet safety heads to facilitate connection of the adapter with the inlet and outlet safety heads.

13. A flange adapter assembly, comprising:

an inlet flange member having bolt recesses forming a bolting pattern and a centralized conduit for directing pressurized fluid therethrough;

an outlet flange member having bolt recesses and a centralized conduit for relieving pressurized fluid therethrough;

a plurality of bolts configured to connect the inlet flange member to the outlet flange member, the plurality of bolts extending through the bolt recesses of the inlet and outlet flange members, the plurality of bolts forming a bolt circle;

a safety head member having an outer circumference shaped to fit entirely within the bolt circle, the safety head member configured to be sealed between the inlet flange member and the outlet flange member, the safety head member having a cylindrical bore defining a central axis;

an insert device held in position relative to the cylindrical bore of the safety head member; and an adapter configured to be selectively connected to the safety head member, the adapter having a central opening defining an internal perimeter boundary and an exterior perimeter defining an exterior perimeter boundary, the exterior perimeter boundary shaped to exhibit a plurality of recesses therealong, the plurality of recesses being spaced to receive a plurality of different flange bolting patterns for the same size conduit, wherein the adapter is configured to align the central axis of the cylindrical bore of the safety head member coaxially with the central axis of the fluid flowpath of the two flange members.

14. The flange adapter assembly of claim 13, wherein the adapter is further configured to fit a plurality of different bolting patterns associated with different pressure ratings.

15. The flange adapter assembly of claim 13, wherein the adapter is positioned on an inlet side of the safety head member.

16. The flange adapter assembly of claim 13, wherein the adapter is positioned on an outlet side of the safety head member.

17. The flange adapter assembly of claim 13, wherein the safety head member is a first safety head member, further comprising:

a second safety head member;

wherein the adapter is positioned between the first safety head member and the second safety head member.

18. The flange adapter assembly of claim 13, wherein the adapter is integral to the insert device and formed along an exterior perimeter of the insert device.

19. The flange adapter assembly of claim 13, wherein the adapter is selectively connected to the safety head member by screws.

20. The flange adapter assembly of claim 13, wherein the adapter is selectively connected to the safety head member by spring clip fasteners.

21. The flange adapter assembly of claim 13, wherein the adapter is connected to the safety head member by welding, crimping, or adhesive bonding.

22. The flange adapter assembly of claim 13, wherein the insert device is a rupture disk and wherein the adapter is dimensioned such that the adapter aligns a rupture disk opening with an opening of the flange members.

23. The flange adapter assembly of claim 22, wherein the rupture disk and safety head member are provided as a unitary single piece unit.

24. The flange adapter assembly of claim 13, wherein each recess is defined by the exterior perimeter boundary, with none of the recesses forming an aperture located between the internal perimeter boundary and the exterior perimeter boundary of the adapter.

25. A flange adapter assembly for positioning an insert device within a pair of flange members, of a particular size, adapted to be connected together, comprising:
a safety head member; and
an adapter configured to be selectively connected to the safety head member, the adapter having a central opening defining an internal perimeter boundary and an exterior perimeter defining an exterior perimeter boundary, the exterior perimeter boundary shaped to exhibit a plurality of recesses therealong, the plurality of recesses being spaced to receive a plurality of different flange bolting patterns for the same size conduit, the exterior perimeter boundary further defining a plurality of protrusions, the protrusions configured to extend between a plurality of bolts from any of the plurality of different flange bolting patterns;
wherein the flange adapter further includes side lugs formed integrally therewith, the side lugs having openings aligned with the safety head member to facilitate connection of the adapter with the safety head member.

26. A pressure relief assembly, comprising:
an inlet flange member having bolt recesses forming a bolting pattern and a centralized conduit for directing pressurized fluid therethrough;
an outlet flange member having bolt recesses and a centralized conduit for relieving pressurized fluid therethrough, the bolt recesses and centralized conduit of the outlet flange member corresponding with those of the inlet flange member;
a plurality of bolts for drawing the inlet and outlet flange members together, the bolts extending through the bolt recesses of the inlet and outlet flange members;
a safety head assembly installed between the inlet and outlet flange members including:
a pressure-containing safety head member configured to fit entirely within a circumference formed by the plurality of bolts;
a rupture disk for placement in association with the safety head member; and
a flange adapter configured to be selectively connected to the safety head member, the adapter having a central opening defining an internal perimeter boundary and an exterior perimeter defining an exterior perimeter boundary, the exterior perimeter boundary shaped to exhibit a plurality of recesses therealong, the plurality of recesses being spaced to receive a plurality of different flange bolting patterns for the same size conduit, the flange adapter further including a plurality of protrusions defined by the exterior perimeter boundary of the adapter, the protrusions configured to extend between at least two of the plurality of bolts; and
wherein the adapter is aligned within the inlet and outlet flange members by receiving the plurality of bolts through the plurality of recesses.

27. The pressure relief assembly of claim 26, wherein the adapter is further configured to fit a plurality of different bolting patterns associated with different pressure ratings.

28. The pressure relief assembly of claim 26, wherein the flange adapter is positioned on an inlet side of the safety head member.

29. The pressure relief assembly of claim 26, wherein the flange adapter is positioned on an outlet side of the safety head member.

30. The pressure relief assembly of claim 26, wherein the rupture disk and safety head member are provided as a unitary single piece unit.

31. The pressure relief assembly of claim 26, wherein the safety head member is a first safety head member, further comprising:
a second safety head member;
wherein the flange adapter is positioned between the first safety head member and the second safety head member.

32. The pressure relief assembly of claim 26, wherein the flange adapter is selectively connected to the safety head member by screws.

33. The pressure relief assembly of claim 26, wherein the flange adapter is selectively connected to the safety head member by spring clip fasteners.

34. The pressure relief assembly of claim 26, wherein the flange adapter is integral to the rupture disk and formed along an exterior perimeter of the rupture disk.

35. The pressure relief assembly of claim 26, wherein the flange adapter is dimensioned such that the flange adapter aligns a rupture disk opening with the centralized conduits of the flange members.

36. The pressure relief assembly of claim 26, wherein each recess is defined by the exterior perimeter boundary, with none of the recesses forming an aperture located between the internal perimeter boundary and the exterior perimeter boundary of the adapter.

37. A pressure relief assembly, comprising:
an inlet flange member having bolt recesses forming a bolting pattern and a centralized conduit for directing pressurized fluid therethrough;
an outlet flange member having bolt recesses and a centralized conduit for relieving pressurized fluid therethrough, the bolt recesses and centralized conduit of the outlet flange member corresponding with those of the inlet flange member;
a plurality of bolts for drawing the inlet and outlet flange members together, the bolts extending through the bolt recesses of the inlet and outlet flange members;
a safety head assembly installed between the inlet and outlet flange members including:
a safety head member;
a rupture disk for placement in association with the safety head member; and
a flange adapter configured to be selectively connected to the safety head member, the adapter having a central opening defining an internal perimeter boundary and an exterior perimeter defining an exterior perimeter boundary, the exterior perimeter boundary shaped to exhibit a plurality of recesses therealong, the plurality of recesses being spaced to receive a plurality of different flange bolting patterns for the same size conduit, the flange adapter further including a plurality of protrusions defined by the exterior perimeter boundary of the adapter, the protrusions configured to extend between at least two of the plurality of bolts;

wherein the adapter is aligned within the inlet and outlet flange members by receiving the plurality of bolts through the plurality of recesses; and, wherein the flange adapter further includes side lugs formed integrally therewith, the side lugs having openings aligned with the safety head member to facilitate connection of the adapter with the safety head members.

38. A flange adapter assembly for positioning an insert device within a pair of flange members, of a particular size, that are adapted to be connected together by a plurality of bolts forming a bolting pattern, comprising:

a pressure containing boundary;

an adapter configured to be selectively connected to the pressure containing boundary, the adapter having a central opening defining an internal perimeter boundary and an exterior perimeter defining an exterior perimeter boundary, the exterior perimeter boundary shaped to exhibit a plurality of recesses therealong, the plurality of recesses being spaced to receive a plurality of different flange bolting patterns for the same size conduit; and the adapter having an asymmetrical design for facilitating removal of the assembly from the flange members, the asymmetrical design including recesses of a first size and shape on a first side of the adapter and recesses of a second size and shape on a second opposing side of the adapter; and further including a plurality of protrusions defined by the exterior perimeter boundary of the adapter, the protrusions configured to extend between each of the plurality of bolts forming a bolting pattern.

39. The flange adapter assembly of claim 38, wherein the recesses on the first side of the adapter are configured to more closely surround the plurality of bolts than the recesses on the second opposing side of the adapter, thereby facilitating a sliding removal of the assembly from within a pair of flange members, in a direction opposite the second side, upon removal of less than all of the plurality of bolts.

40. The flange adapter of claim 38, wherein the protrusions on the first side of the adapter include outwardly extending flares.

41. The flange adapter assembly of claim 38, wherein each recess is defined by the exterior perimeter boundary, with none of the recesses forming an aperture located between the internal perimeter boundary and the exterior perimeter boundary of the adapter.

42. A gasket assembly for insertion within a pair of flange members, of a particular size, that are adapted to be connected together by a plurality of bolts forming a bolting pattern, comprising:

a pressure containing boundary;

a gasket having a central opening defining an internal perimeter boundary and an exterior perimeter defining an exterior perimeter boundary, the exterior perimeter boundary shaped to exhibit a plurality of recesses therealong, the plurality of recesses being spaced to receive a plurality of different flange bolting patterns for the same size conduit; and the gasket having an asymmetrical design for facilitating removal of the gasket from the flange members, the asymmetrical design including recesses of a first size and shape on a first side of the gasket and recesses of a second size and shape on a second opposing side of the gasket; and further including a plurality of protrusions defined by the exterior perimeter boundary of the gasket, the protrusions configured to extend between each of the plurality of bolts forming a bolting pattern.

43. The gasket assembly of claim 42, wherein the recesses on the first side of the gasket are configured to more closely surround the plurality of bolts than the recesses on the second opposing side of the gasket, thereby facilitating a sliding removal of the assembly from within a pair of flange members, in a direction opposite the second side, upon removal of less than all of the plurality of bolts.

44. The gasket assembly of claim 42, wherein the protrusions on the first side of the gasket include outwardly extending flares.

45. The gasket assembly of claim 42, further comprising a rupture disk device for installation in association with the pressure containing boundary.

46. The gasket assembly of claim 45 wherein the gasket is integral to the rupture disk device and formed along an exterior perimeter of the rupture disk device such that the gasket aligns a rupture disk opening with an opening of the conduit in the flange members.

47. The gasket assembly of claim 42, wherein each recess is defined by the exterior perimeter boundary, with none of the recesses forming an aperture located between the internal perimeter boundary and the exterior perimeter boundary of the adapter.

48. A flange adapter assembly, comprising:

a pair of flange members adapted to be connected together by a plurality of bolts forming a bolting pattern, the two flange members defining a fluid flowpath having a central axis;

an insert device;

a safety head member having an outer circumference shaped to fit entirely within a bolt circle formed by the plurality of bolts, the safety head member configured to be sealed between the pair of flange members, the safety head member having a cylindrical bore defining a central axis, wherein the safety head member is configured to position the insert device relative to the central axis of the two flange members; and an adapter connected to the safety head member after manufacture and before installation within a pressurized fluid system, the adapter having a central opening defining an internal perimeter boundary and an exterior perimeter defining an exterior perimeter boundary, the exterior perimeter boundary shaped to exhibit a plurality of recesses therealong, the plurality of recesses being spaced to receive a plurality of different flange bolting patterns for the same size conduit, wherein the adapter is configured to align the central axis of the cylindrical bore of the safety head member coaxially with the central axis of the fluid flowpath of the two flange members.

49. A pressure relief assembly, comprising:

an inlet flange member having bolt recesses forming a bolting pattern and a centralized conduit for directing pressurized fluid therethrough;

an outlet flange member having bolt recesses and a centralized conduit for relieving pressurized fluid therethrough, the bolt recesses and centralized conduit of the outlet flange member corresponding with those of the inlet flange member;

a plurality of bolts for drawing the inlet and outlet flange members together, the bolts extending through the bolt recesses of the inlet and outlet flange members;

a safety head assembly installed between the inlet and outlet flange members including:

a pressure-containing safety head member configured to fit entirely within a circumference formed by the plurality of bolts;

a rupture disk for placement in association with the safety head member; and a flange adapter connected to the safety head member after manufacture and before installation within a pressurized fluid system, the adapter having a central opening defining an internal perimeter boundary and an exterior perimeter defining an exterior perimeter boundary, the exterior perimeter boundary shaped to exhibit a plurality of recesses therealong, the plurality of recesses being spaced to receive a plurality of different flange bolting patterns for the same size conduit, the flange adapter further including a plurality of protrusions defined by the exterior perimeter boundary of the adapter, the protrusions configured to extend between at least two of the plurality of bolts; and wherein the adapter is aligned within the inlet and outlet flange members by receiving the plurality of bolts through the plurality of recesses.

\* \* \* \* \*